United States Patent
Rushworth et al

[11] 3,910,679
[45] Oct. 7, 1975

[54] SINGLE PULSE SELECTION SYSTEM

[75] Inventors: Paul M. Rushworth; Robert W. McMillan; Vincent J. Corcoran, all of Orlando, Fla.

[73] Assignee: Martin-Marietta Corporation, Orlando, Fla.

[22] Filed: Nov. 14, 1973

[21] Appl. No.: 415,608

[52] U.S. Cl. .............. 350/150; 250/225; 250/232; 350/160 R
[51] Int. Cl.² ........................................ G02F 1/03
[58] Field of Search......... 350/150, 160 R; 307/268, 307/283, 302; 250/225, 232

[56] References Cited
UNITED STATES PATENTS

| | | | |
|---|---|---|---|
| 3,268,822 | 8/1966 | Hickey | 328/67 |
| 3,423,595 | 1/1969 | Hickey | 350/150 X |
| 3,519,328 | 7/1970 | Grossman | 350/150 |
| 3,564,454 | 2/1971 | Hook et al. | 350/150 X |
| 3,577,097 | 5/1971 | Hilberg | 350/150 X |

*Primary Examiner*—Paul L. Gensler
*Attorney, Agent, or Firm*—Julian C. Renfro, Esquire; Gay Chin, Esquire

[57] ABSTRACT

A single pulse selection system is presented for selecting a single high speed pulse emanating from a source of monochromatic collimated radiation. Previously, no entirely satisfactory procedure is known to have existed in the prior art for selecting out a single very short optical pulse from a train of pulses produced for example by a mode locked laser, whose pulses are spaced closer than ten nanoseconds. A Pockels cell disposed between crossed polarizers is commonly used as the electro-optic shutter or switching element in optical paths, for optical signals can be blocked when there is no voltage gradient across the cell, whereas signals can be passed by such element when a sufficient voltage gradient, on the order of 3200 volts/cm is applied. Although available transistor circuits can turn on the voltage gradient to the cell when such is to be applied in less than the ten nanoseconds required to isolate and pass a single pulse, these circuits cannot turn off rapidly enough that removal of the gradient can be accomplished in the same length of time. It is therefore the purpose of this invention to overcome such switching time problem and thus provide a method of selecting a single pulse from a train of closely spaced optical pulses. Initially both sides of the electro-optic shutter are at a high potential so no potential gradient exists. A first circuit is then turned on that serves to quickly reduce the potential on the first side of the cell to zero, which causes a gradient to be established such that the desired optical signal can pass. Instead of thereafter attempting to turn off the first circuit after the desired interval, in accordance with this invention, a second circuit is turned on to reduce the potential of the second side of the cell to zero, causing the gradient across the cell to no longer exist, and accordingly causing the blockage of the optical radiation. Subsequently, both circuits are turned off synchronously so the cell does not experience a gradient during the switch recovery period.

17 Claims, 9 Drawing Figures

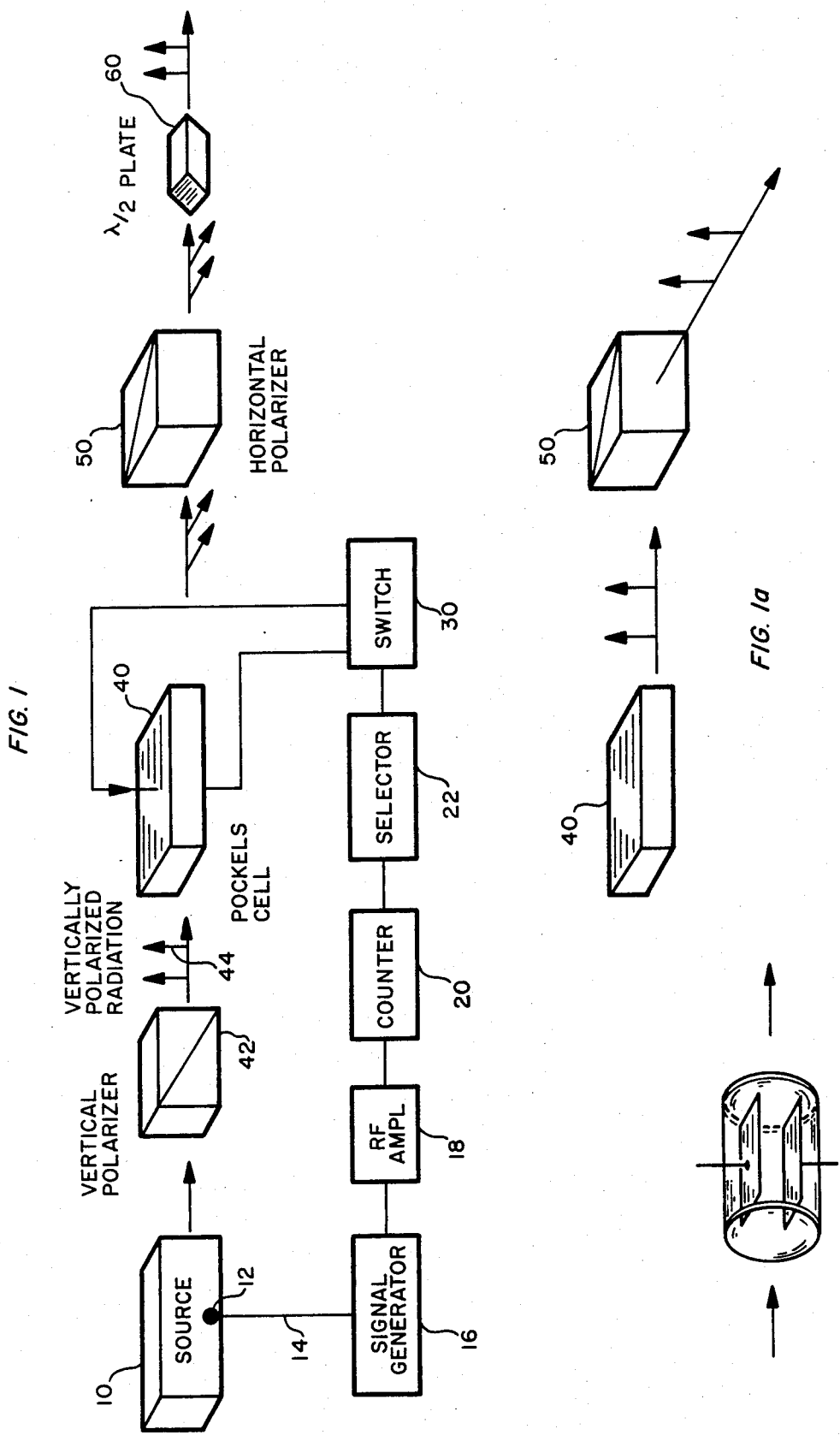

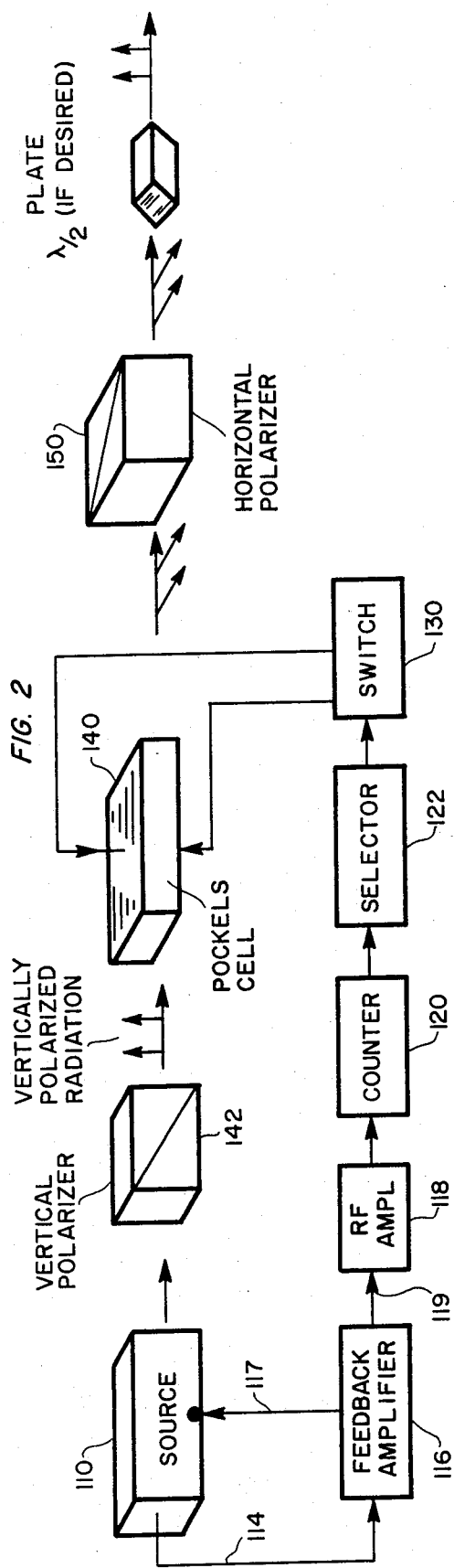

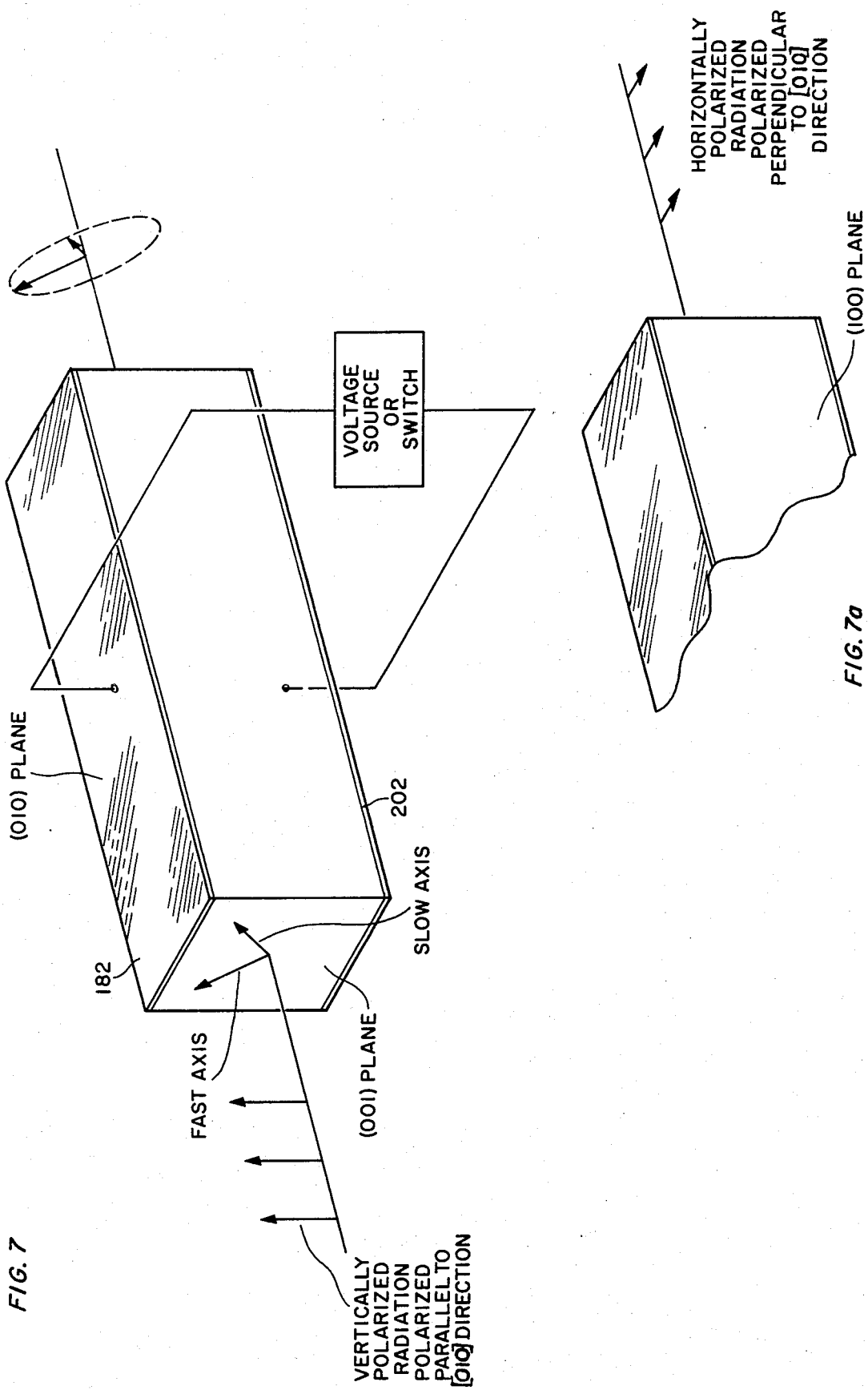

SINGLE PULSE SELECTION SYSTEM

BACKGROUND OF THE INVENTION

1. Field of the Invention

It is known to be able to generate mode locked laser pulses which have spacings of less than ten nanoseconds, and widths on the order of 100 picoseconds. However, these pulses are not usable for ranging or for any particularly useful purpose unless a single pulse from the train can be selected and transmitted. As will be seen hereinafter, it is an object of this invention to make such single pulse selection possible.

2. Description of the Prior Art

This invention relates to a high speed electro-optic switch capable of selecting one pulse from a train of pulses emitted from a mode locked laser, and in particular to a switch which uses a Pockels effect cell between crossed polarizers as an electro-optic shutter or switch, and two transistor avalanche switches operated in a differential mode as a high speed driving circuit.

Mode locked lasers emit radiation consisting of pulses of about 100 picoseconds width, spaced 3 to 10 nanoseconds apart. The pulse spacing is governed by the relationship $\nu = c/2l$, where $\nu$ is the pulse repetition frequency, $c$ is the velocity of light, and $l$ is the length of the laser cavity. These pulses as a result of the laser radiation being synchronously reinforced by a radio frequency signal applied to a modulator within the laser cavity. The radio frequency modulating signal may come from an external generator or it may be derived from the laser cavity itself by using the cavity as the frequency sensitive element in a tuned oscillator. The output of such lasers is usually linearly polarized, but the invention described herein does not depend for its operation on this polarization.

In some applications of this type laser, it is necessary to select pulses from the high frequency pulse train at a lower repetition rate or it may even be necessary to select a single pulse from the train. A device capable of accomplishing this selection must have very fast rise and fall times (about 2–3 nanoseconds) and must have good rejection of unwanted pulses. As will be set forth at length hereinafter, this invention provides a highly advantageous means for effecting this selection by using a Pockels effect cell and a novel transistor differential avalanche switch.

Several prior art patents have taught the use of electrically activated light blocking and polarizing elements such as Pockels cells for modulating optical signals. However, none of these has exhibited any knowledge or awareness of the high advantageous cell activating and deactivating techniques of the present invention. Rather, it was typical to use a Pockel cell arrangement in which both sides of the Pockels cell are initially at zero potential, and the optical pulse passed by raising one side to a higher potential, then discharging the voltage at that side of the cell to return both sides of the cell to the zero potential states.

When a Pockels cell is being used as the switching element in optical paths, a gradient sufficient to allow the desired pulse or signal to pass must be applied, and when such a cell is being used for example with a mode locked laser to isolate and pass a single pulse, the gradient must be applied in less than 2 to 3 nanoseconds, and removed in the same time. Although known transistor circuits can turn off the gradient in this very small length of time, they are quite unable to turn it on rapidly enough. As explained in detail herein, this invention overcomes the switching time problem in a highly effective and economical manner.

SUMMARY OF THIS INVENTION

This invention relates to the apparatus and method for selecting a single optical pulse from a high frequency train of optical pulses through the use of a selectively operated electro-optic shutter disposed in the optical path of the pulse train. This shutter may involve a Pockels cell utilized between polarizers that are orthogonally disposed. By way of example, a vertically polarized train of optical pulses is directed through a Pockels cell and thereafter a polarizer which passes only horizontally polarized light. The cell, when activated by applying a potential thereacross, horizontally polarizes the optical pulses, thus permitting the pulses to pass through the succeeding polarizer. If the Pockels cell is not activated, the pulses retain their original vertical polarization and are blocked by the succeeding polarizer.

To activate and deactivate the Pockels cell with sufficient speed to selectively pass a single pulse from the pulse train, a differential avalanche switch in accordance with this invention is utilized to apply the required potential to the cell, and thereafter remove same. The switch initially applies equal potentials to both sides of the cell so that no potential difference exists thereacross. One side of the differential switch is turned on and grounds one side of the cell immediately prior to receipt of an optical pulse, thus to activate the cell and pass the pulse. Immediately thereafter, the other side of the cell is also grounded by turning on the other side of the differential avalanche switch to thereby deactivate the cell by grounding both sides thereof. The two sides of the differential avalanche switch then recover with equal recovery time constants to maintain equal potential on both sides of the Pockels cell.

A primary application for this invention to data has been in a simulator for simulating the laser utilized for testing receiver systems or counter-measure systems, such that narrow band signals can be provided at controllable power levels. By utilizing a laser simulation arrangement, an actual laser which is, of course, much larger and more expensive, is not needed. The present invention is also effective in communications work and in ranging.

As should be obvious, the terms vertically polarized and horizontally polarized as used above were employed only for convenience of illustration, for as long as the output polarizer is polarized in a direction orthogonal to that of the input polarizer, or orthogonal to the polarization of the radiation emitted from the input source when a polarized source is used, our device can operate in the intended manner.

It is therefore a primary object of this invention to provide apparatus enabling the selection of one pulse of a train of pulses having nanosecond spacing.

It is another object of our invention to provide a high speed selection system for selecting a high speed pulse emanating from a source of monochromatic collimated radiation.

It is yet another object of our invention to provide a high speed pulse selection system utilizing a novel high speed switch serving to operate an electro-optic shutter that may be opened for times as short as a few nanoseconds, such that a single pulse varying in width from a few picoseconds to the length of time the shutter is opened, can be selectively isolated.

It is still another important object of our invention to provide a novel high speed electronic switch to be connected to the terminals of a Pockels cell in such a way as to enable a momentary change in the polarization of the radiation passing through the cell.

It is yet still another object of this invention to provide a differential avalanche switch involving a pair of related circuits, with the arrangement being such as to utilize the rapid turn on time for each part of the circuit for controlling the transmission of the optical switch, without involving the much longer recovery time of such circuitry.

These and other objects, features and advantages of this invention will be more apparent from the enclosed drawings in which:

FIG. 1 is a block diagram of a somewhat simplified primary embodiment of our invention in which a short pulse of radiation from a mode locked laser controlled by an external signal generator, is being passed as a result of the momentary application of high wave voltage to an electro-optic shutter, in this instance a Pockels cell;

FIG. 1a is a fragmentary view, relatable to FIG. 1, showing radiation being emitted from the throwout port of the polarizer because half wave voltage is not applied to the Pockels cell in this case;

FIG. 1b is a fragmentary view of a Kerr cell of the type that may be used instead of the Pockels cell as the active element of an electro-optic shutter.

FIG. 2 is a block diagram of another embodiment of our single pulse selection system, in which the source of radiation is a mode locked laser whose output is controlled by an internal feedback amplifier;

FIG. 3 is a third embodiment of our single pulse selection system in which the source of radiation is a monochromatic collimated CW source;

Figure 6:
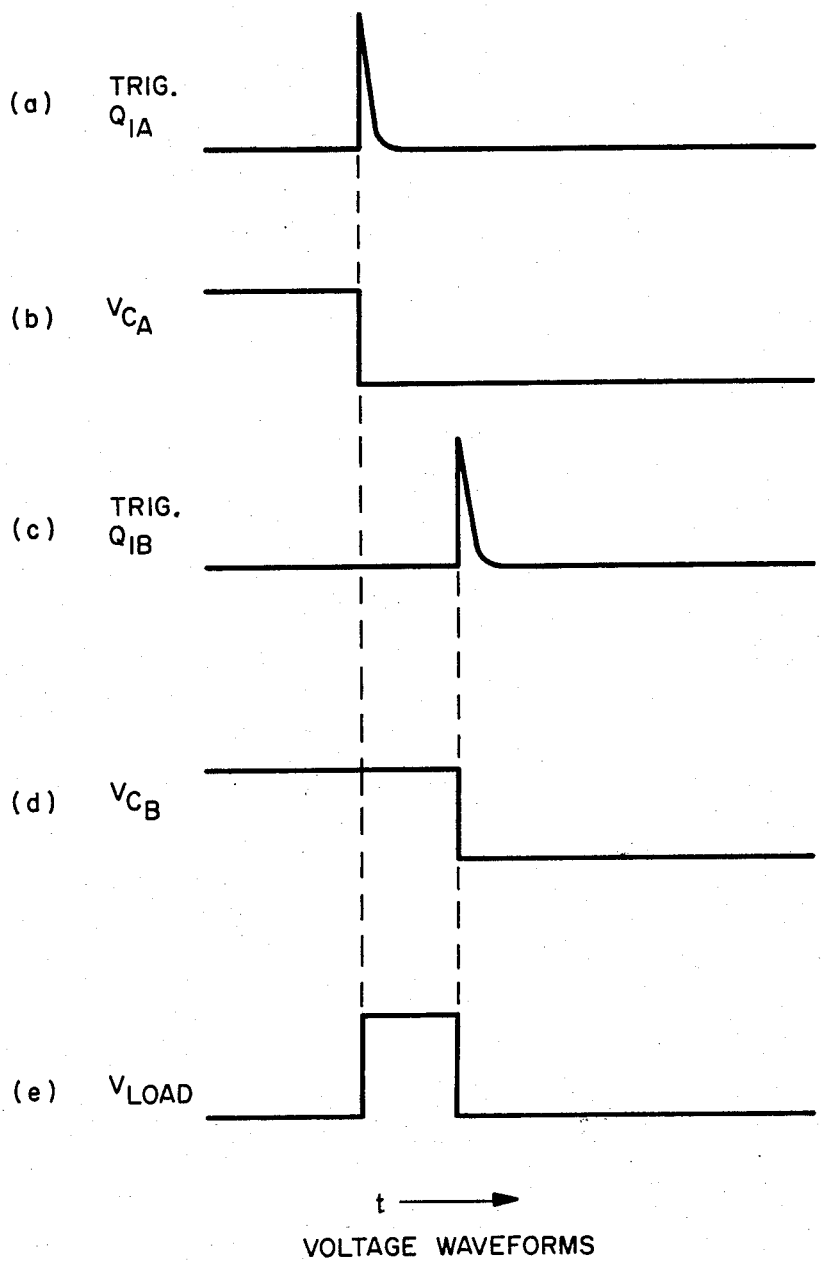

FIG. 6 reveals typical waveforms at various selected switch locations during the time when the differential avalanche switch is being operated to bring about the selection of the single desired pulse;

FIG. 7 is a view to a larger scale of the active portion of the electro-optic shutter, revealing in simplified form, an arrangement making it possible to change the birefringence of the crystal used; and FIG. 7a reveals in fragmentary form, the horizontally polarized output of the shutter portion at such time as a half wave voltage exists across the crystal.

DETAILED DESCRIPTION

Turning now to the drawings, it will be seen that FIGS. 1 and 2 relate to embodiments of this invention enabling certain pulses to be selected from a train of closely spaced optical pulses emitted from a source at a 250 MHz to 300 MHz repetition rate, for example, In each embodiment, the source emits radiation in the form of optical pulses directed along an optical path in which are disposed certain components to be described in detail hereafter.

In the preferred embodiment illustrated in FIG. 1, the source 10 is preferably a CW mode locked laser that, for example, utilizes YAG: neodymium as its lasing element. The laser 10 may be regarded as having an input terminal 12, to which is attached a lead 14 serving to connect the laser with a signal generator 16, which provides the laser with a modulation signal, such that the laser emits mode locked pulses in synchronization with the input from the signal generator. It should be noted that part of the signal generator output is picked off and provided to RF amplifier 18, where the output is amplified and used to drive a counter 20. Counter 20 is preferably made up of a chain of decade counters that serve to count down from the pulse repetition frequency of the laser output, which may be several hundred megahertz, to some lower frequency at which an electro-optic shutter may be driven. Although we are not to be limited to the use of a Pockels cell, we nevertheless prefer to use a Pockels cell 40 as the active portion of the shutter. The electro-optic shutter may be regarded as including the cell 40, the preceding polarizer 42, which is used when the output from the source 10 is not intrinsically polarized, and the succeeding polarizer 50.

The output of counter 20 is directly connected to a Repetition Rate Selector 22 which, as will be set forth in detail hereinafter in FIG. 4, makes it possible to establish a desired output frequency of counter 20, and in turn, causes a unique switch 30 to function in such a manner as to activate the Pockels cell portion of the electro-optic shutter such that it operates at a frequency at which desired pulses emanating from the source 10 are selected. Since the excitation signal for both the source 10 and the counter 20 are derived from the same signal generator 16, the operation of the Pockels cell 40 by the switch 30 is necessarily synchronized, within a fixed phase angle, with the pulses emitted from the source 10. As will be seen hereinafter, the switch 30 forms a significant part of the present invention.

The outputs of the later decade counter stages of counter 20 representing frequencies which we desire to select are each fed into a separate AND gate, located in selector 22, with the outputs of the AND gates being fed into a common OR gate; see FIG. 4. The output of the OR gate of selector 22 is connected to the switch 30, and as will be discussed hereinafter, this arrangement makes it possible to select the desired output frequency of the system by the appropriate manipulation of a switch within selector 22. Such switch serves to enable the one AND gate corresponding to the selected frequency, and to inhibit all the other AND gates.

A preferred embodiment of this invention is capable of output frequencies of 12 Hz, 1.2 KHz, and 12 KHz, in addition to single shot operation. By using well known counter feedback and gating techniques, other repetition frequencies are available, although we have found that 12 KHz is near the upper limit of operation of the novel switch 20. The operation of switch 30 is such as to enable the electro-optic shutter to accomplish a form of gating action with respect to pulses passing along the aforementioned optical path.

Considering the optical aspects of this invention, it is important that the output of the source 10 be polarized.

The external polarizer is required if the source 10 is intrinsically polarized, such as is the case with mode-locked lasers or certain CW gas lasers, but for clarity, a separate preceding polarizer 42 is illustrated in FIG. 1. Assuming a vertical polarization, vertically polarized pulses 44 pass unaffected through Pockels cell 40 if the potential on both of the cell terminals is equal, or in the present invention, if both are maintained at a voltage equal to the half wave voltage of the cell. In other words, since in this instance there is no net voltage across the cell, and it displays no optical activity, vertically polarized pulses pass through the cell 40 with no effect, and are thereafter ejected through the throwout port of output polarizer 50. This latter device in this instance is of course a horizontal polarizer. Note in this regard FIG. 1a, wherein ejection of pulses through the throwout port is depicted.

If one side of the Pockels cell is driven to ground, however, by the switch 30 a few nanoseconds before the desired pulse appears at the laser output, this causes the cell 40 to rotate the plane of polarization of the desired pulse to the horizontal direction, allowing the pulse to pass through the horizontal polarizer 50 as shown in FIG. 1. Thereafter the pulse may be caused to pass through a half wave plate 60 in order to restore the output polarizations to its original vertical direction, if such be desired.

Immediately after the desired pulse has passed, the other side of the active portion of the electro-optic shutter is driven to ground in accordance with this invention, again reducing the voltage across the cell to zero. Under this condition, the polarizer 50 again blocks the output of laser pulses, and the condition illustrated in FIG. 1a again becomes applicable.

It is to be kept in mind that we regard the Pockels cell in conjunction with the preceding and succeeding polarizers as being an electro-optic shutter or switch. Also, it is to be noted that the terms horizontal and vertical are used herein by way of illustration only, and as long as the output polarizer is polarized orthogonal to the input polarization, the device can be operated in the intended manner. Further, it should be mentioned that it is possible, if such for any reason desirable, to transmit continuous radiation through the half wave plate 60, with only the selected pulse being emitted from the throwout port of the horizontal polarizer 50. This latter is of course achieved by rotating the output polarizer through an angle of 90°.

Referring now to FIG. 2, it will be seen that in this embodiment of our invention, an arrangement generally similar to that of FIG. 1 is utilized, but in this instance the cavity of mode locked laser 110 is a tuned element which generates mode locked pulses in response to a feedback signal derived from the laser cavity. The feedback signal from the laser 110 is carried by a lead 114 to a device 116 hereinafter referred to as an RF feedback amplifier. An output lead 117 from this amplifier drives an electro-optic or acousto-optic modulator crystal (not shown) disposed in the laser cavity. The excitation of this crystal at the natural cavity resonant frequency effects mode locking of the laser such that a train of narrow, closely spaced optical pulses is emitted from the laser. A lead 119 is connected such that the RF energy within the mode lock feedback loop is sampled, which energy is then amplified by RF amplifier 118 such that an appropriate signal can be delivered to counter 120. Selector 122 makes it possible to derive a desired signal that operates switch 130, with this signal being in synchronization with the arrival of a desired mode locked pulse at the Pockels cell 140. The repetition rate selector 122, as was the case with selector 22 in FIG. 1, enables the action of the counter to be controlled such that the Pockels cell 140 is activated to gate the laser pulses at a selected one of many desired repetition frequencies.

As will be apparent, the functioning of the device in accordance with FIG. 2 is identical with that of FIG. 1 insofar as outputs from the horizontal polarizer are concerned, so additional explanation of the embodiment of FIG. 2 is not believed to be necessary at this time.

FIG. 3 shows a third embodiment of this invention in which the source 210 is not required to be a laser but may be a monochromatic, well collimated non-coherent optical source. For example, the source 210 may be a tungsten filament whose radiation passes through a narrow band interference filter and a collimating optical system before providing an input to the polarizer 242. Of course, it is also possible to use a CW, non mode locked laser as the source 210 in FIG. 3 because lasers are both monochromatic and well collimated.

Figure 5:
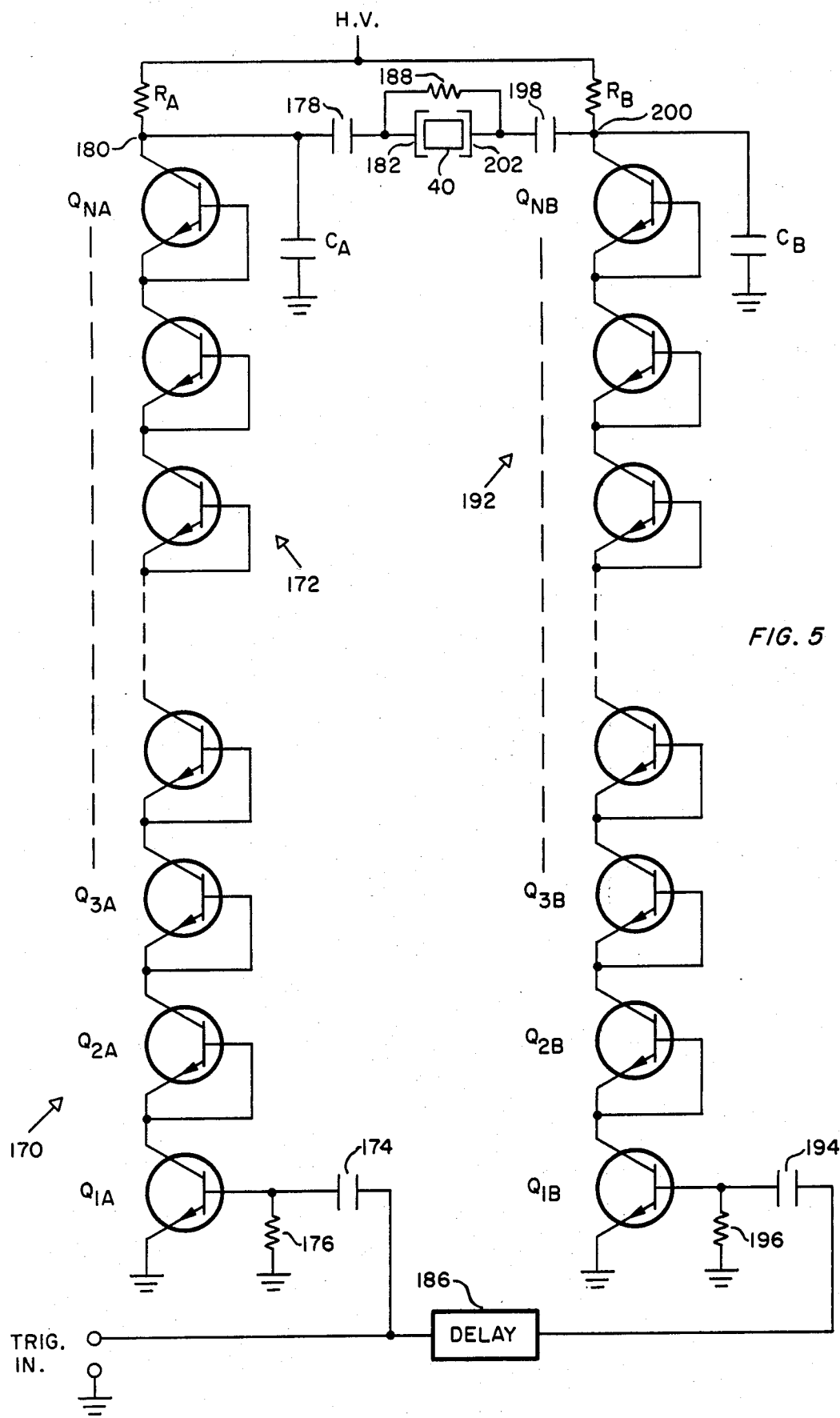
FIG. 5 is a schematic block diagram of the novel dual avalanche switch used to apply a narrow pulse of half wave voltage successively to each terminal of an electro-optic shutter when a single pulse is to be selected in accordance with this invention.

In this case it is not necessary to use the elaborate countdown and frequency selection circuitry shown in FIGS. 1 and 2, and the generation of a pulse output from the system of FIG. 3 is achieved by driving the switch 230 from a pulse generator 220 at any desired pulse repetition frequency up to the maximum capability of the switch 230. The switch 230 may be regarded as the high speed switch in accordance with this invention, as depicted in FIG. 5. If this method of operation is used, the polarizer 250 serves to block the continuous radiation emanating from the source except for the relatively short period of time when the switch 230 is activated, rotating the plane of polarization of the radiation incident on the polarizer 250 so that a pulse of radiation is passed from the system. Thus, the selection system has effectively taken a "bite" or "chunk" of the radiation from the source and passed it in the form of a narrow pulse. As is also the case with the embodiments of FIGS. 1 and 2, it is also possible, by rotation of the output polarizer through an angle of 90°, to pass the selected narrow pulse through the throwout port of the polarizer and to transmit continuous radiation, except for the passed pulse, along the original optical path.

Figure 4:
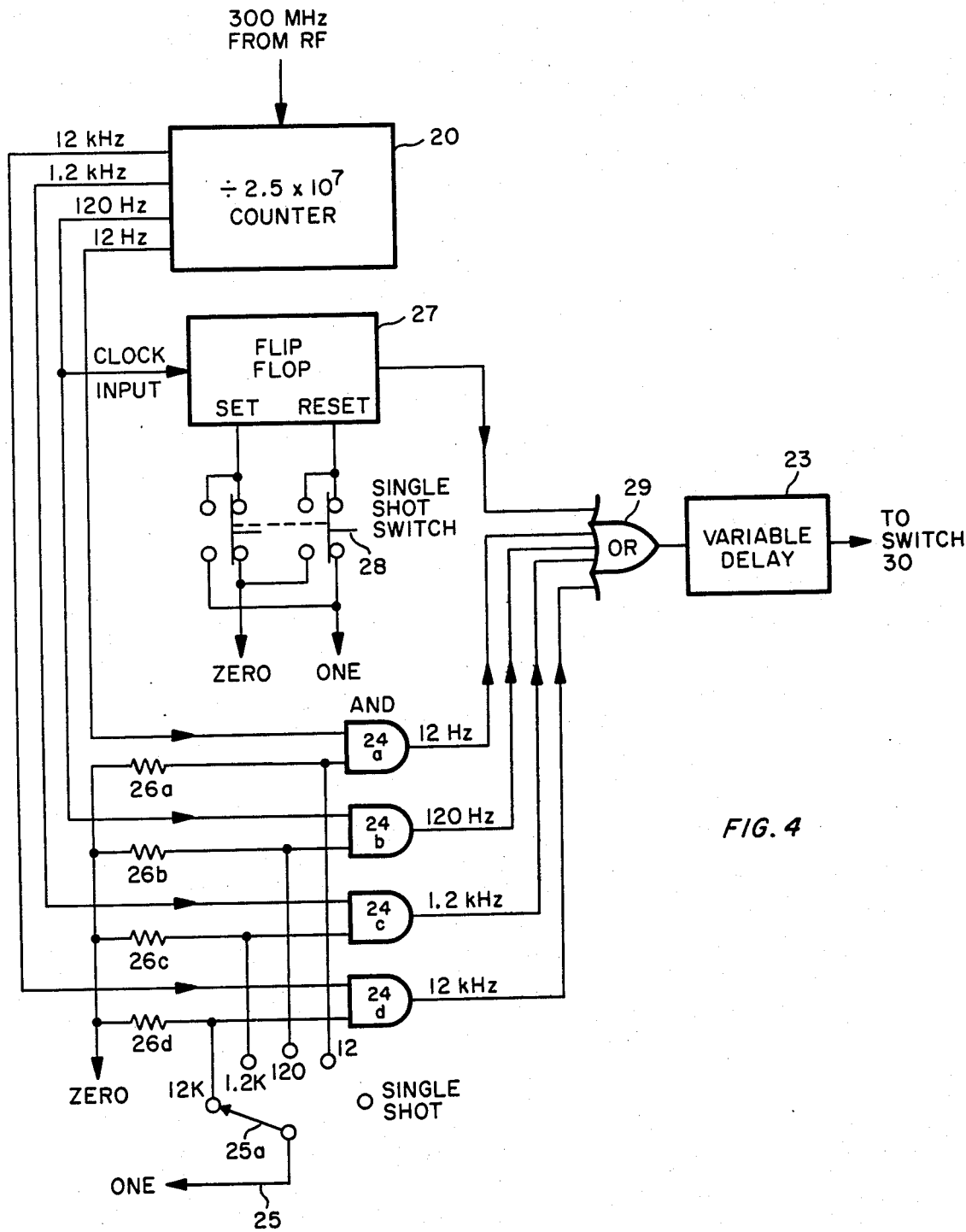
FIG. 4 is a block diagram of the logic circuitry used to control the pulse repetition frequency of the single pulse selection system in the embodiment of FIGS. 1 and 2.

FIG. 4 shows in schematic form the frequency selection circuitry, and indicates the manner in which the various available repetition frequencies can be generated, utilizing in this instance a mode locked laser operating for example at 300 MHz as a radiation source. The 300 MHz signal input to the amplifier comes from either a signal generator as shown in FIG. 1 or from a feedback amplifier depending on whether the embodiment of FIG. 1 or the embodiment of FIG. 2 is chosen for implementation. As previously indicated, the counter 20 is made up of a series of decade counters, with outputs from the device being available between different counter stages. In this instance, the outputs from the counter 20 are designated 12 Hz, 120 Hz, 1.2 KHz and 12 KHz, which are connected to AND gates 24a, 24b, 24c and 24d, respectively.

The outputs of these gates are each connected to an OR gate 29, thence through a variable delay circuit 23, whose output in turn connects to the switch 30 (or 130 or 230). The purpose of the variable delay circuit 23 is to shift very slightly the phase of the signal being used to drive the switch 30 so as to compensate for the difference in time between propagation of the desired optical pulse along the optical path and the propagation of the electrical signal through the RF amplifier, counter, and frequency selection circuitry. Adjustment of the variable delay 23, which may be a variable capacitor, positions the desired pulse precisely in the center of the gate formed by the switch 30, so that adjacent undesired pulses are not transmitted and the amplitudes of desired pulses are not degraded by falling too near the edge of the gate.

The gates 24a – 24d are each two-input AND gates, with the other inputs to these gates being connected to individual terminals on a frequency selector switch 25, the wiper 25a of which is connected to a DC voltage which is equal to the logical ONE level. These additional AND gate inputs are also connected through individual resistors 26a through 26d to the logical ZERO level in such a way that positioning of the wiper 25a to one of the four selectable repetition rates will cause the ONE level to override the ZERO level existing on that gate and enable that gate, thereby causing that selected frequency to appear on the output of the corresponding gate. In this instance, the other three AND gates ae inhibited so their outputs are all at the DC level corresponding to logical ZERO. If the switch 25 is placed in the single shot position, all of the four gates are inhibited, as will be understood.

One of the four lowest frequency counter outputs is also directed to the clock input of a set-reset flip-flop or bistable multivibrator 27, such flip-flop having the property that its output changes state only when a ONE clock input coincides with a ONE on either its set or reset inputs, and it does not change state again until its set and reset inputs are again changed. During normal operation, this flip-flop is in the reset state by virtue of having a continuous ONE signal on its reset input and a ZERO on its set input, even though the clock input varies from ZERO to ONE at the rate of the counter output selected to generate this function. If the single shot switch 28 is depressed, a ONE signal is applied to the SET input and a ZERO applied to the RESET input, such that the output state of the flip-flop changes from ZERO to ONE when the clock next goes to ONE. The flip-flop output remains at ONE until the switch is released, applying a ONE to its reset input and a ZERO to its set input, and thus causing it to change state back to ZERO when the clock input next goes to ONE.

The positive going edge generated when the flip-flop changes state to the ONE level is coupled through one input of the OR gate 29 to the input of the differential avalanche switch 30, thus effecting single-shot operation of the latter switch each time the single shot switch is depressed. On the other hand, the other four inputs to the OR gate 29 are each connected to the outputs of the four AND gates corresponding to each of the four selectable repetition rates, such that when single-shot operation is not being utilized, the selected repetition frequency appears at the output of the one designated AND gate, passes through the OR gate 29, and then appears at the input of switch 30.

Our pulse selection system is typically used to select pulses recurring at one of several selectable frequencies, for recurring pulses make it possible to obtain better data such as is needed in connection with radar devices or the like, than is possible with a single pulse. However, for those occasions when it is desirable to have a single shot operation, it now should be clear how a single pulse can be isolated.

Turning now to FIG. 5, it will be seen that the differential avalanche switch 170 in accordance with this invention consists of two strings of serially connected transistors, first string 172 and second string 192, with the two strings connected in parallel to each other. It will be noted that the base and emitter of each transistor of each string are connected together, either directly or through a small resistance. As is known, the application of a trigger pulse to the base of a transistor operated in this way will cause a rapid increase in collector current and a correspondingly rapid decrease in collector-emitter voltage to near zero, and it is important to note that such a collector voltage change may occur in a time as short as 1 nanosecond.

As will be seen in FIG. 5, the trigger input Trig. In. from the selection circuitry is connected to string 172 through the differentiating network comprising capacitor 174 and resistor 176, to the base of transistor $Q_{1A}$. The collector of $Q_{1A}$ is connected to the base and emitter of $Q_{2A}$, and the collector of $Q_{2A}$ is in turn connected to the base and emitter of $Q_{3A}$, and so forth, with the collector of $Q_{NA}$ being connected to terminal 180. One side of resistor $R_A$, and one side of capacitor $C_A$ are also connected to this terminal.

String 192 is configured in the same manner, with the collector of $Q_{1B}$ connected to the base of $Q_{2B}$, the collector of $Q_{2B}$ connected to the base of $Q_{3B}$, and so forth, with the collector of $Q_{NB}$ connected to terminal 200. Both terminal 180 and terminal 200 are supplied with high voltage from a suitable source, as indicated in this figure, with resistors $R_A$ and $R_B$ serving to limit the flow of current to these terminals.

It is to be noted that one side of each capacitor $C_A$ and $C_B$ is connected to terminals 180 and 200 respectively, with the other side grounded. These capacitors are to be regarded as the primary source for the high current that is required to flow through each avalanche string in order to effect the desired sharp voltage drop at the respective plate or terminal of the active portion of the electro-optic shutter, indicated at 40 in FIG. 5.

As is known, a transistor operated in the avalanche mode is operated at a collector-emitter voltage high enough to break the transistor down so that a small amount of current flows. Thus, upon the arrival of a trigger pulse on the base of transistor $Q_{1A}$, it is caused to conduct and to bring about conduction on the part of all the transistors of string 172. As a result, the collector of transistor $Q_{NA}$ is caused to drop sharply in voltage, with the result that capacitor $C_A$ is caused to discharge through string 172 and bring about the aforementioned drop in voltage at the terminal 182 of the active portion of the electro-optic shutter 40.

After the trigger pulse is removed, the voltage on the collector of each transistor recovers to its initial value with a time constant determined by the external circuit. This time constant is much longer than the turn-on time, and may be several milliseconds. Values of the high voltage and of the series resistors $R_A$ and $R_B$ are chosen so that a small amount of breakdown current flows through each of the strings. This current is usually on the order of 100 microamperes for a transistor breakdown voltage of about 100 volts per transistor, and is held nearly constant by the resistors $R_A$ and $R_B$. In this way, voltages of a magnitude of several thousand volts may be switched by adding a sufficient of transistors to the strings. Typically, we use about 12 transistors in each half or portion of the electronic switch 170, so the high voltage indicated in FIG. 5 may be approximately 1500 volts.

Considering the operation of our novel high speed electronic switch now in more detail, after the high voltage is turned on and the breakdown currents are established in the strings, capacitors $C_A$ and $C_B$ are charged by the high voltage source to a potential equal to the sum of the breakdown potentials of the transmitters in each circuit portion. At the desired time, a rectangular trigger pulse is applied to the Trigger Input, which of course is differentiated by the network involving capacitor 174 and resistor 170 to give a sharp waveform, which is applied to the base of transistor $Q_{1A}$ of string 172. The trigger connection to string 192 is accomplished through a suitable delay 186 such that after a time corresponding to the end of the desired transmission time of the electro-optical shutter, the pulse is also applied to $Q_{1B}$ through the network consisting of capacitor 194 and resistor 196.

As mentioned earlier, transistor $Q_{1A}$ has a small amount of breakdown current flowing through it, and it has a voltage between its collector and emitter equal to its breakdown voltage. Therefore, the application of a pulse of current into the base of $Q_{1A}$ causes the current flow in the transistor to increase because the transistor has current gain. The very high electric field between the transistor collector and emitter accelerates the charge carriers generated by the application of the pulses to the transistor base so that these carriers have sufficient energy to dislodge other carriers from their crystalline bonds which in turn remove other carriers, and so on, with the net result that the current in the transistor increases until it is limited only the the bulk resistance of the transistor and any external resistance in the circuit. As will be understood, the abrupt increase in current in $Q_{1A}$ and the accompanying voltage decrease, triggers the same phenomenon in transistors $Q_{2A}$ through $Q_{NA}$, so that the terminal 180 is reduced almost to ground potential. Furthermore, the avalanche multiplication effect described above occurs very rapidly, usually within two or three nanoseconds, so that the net result at point terminal 180 is a very rapidly decreasing voltage waveform of up to several thousand volts magnitude. It is to be noted that this avalanche effect does not occur without a trigger pulse being applied to the base of the first transistor $Q_{1A}$ because resistors $R_A$ and $_B$ limit the breakdown current to a level which is not sufficient to sustain the avalanche. Avalanche current stops flowing in string 172 when capacitor $C_A$ has been discharged, and the circuit begins to recover.

As will be obvious to those skilled in the art, a disadvantage of using a single avalanche switch portion for fast switching is that the voltage at terminal 180 returns to its original value with time constant $R_A C_A$, which may be several microseconds. Unfortunately, this is too slow if it is desired to isolate a single fast pulse in a train of closely spaced pulses. This problem is solved in accordance with this invention by providing the second avalanche switch portion, string 192, which operates to restore the voltage across the active portion of the electro-optic shutter 40 rapidly to zero to avoid the long recovery time. If the values of $R_A$ and $C_A$ of string 172 are chosen to equal those of $R_B$ and $C_B$ of string 192, the voltage across the terminals 182 and 202 of the active portion of the electro-optic shutter will remain at zero while capacitors $C_A$ and $C_B$ are recovering to their original charge in preparation for the next trigger pulse.

FIG. 6 shows the waveforms associated with this differential avalanche switch. A sharp trigger pulse of the type shown in line (a) of FIG. 6 is applied to the base of $Q_{1A}$ through the differentiating network involving components 174 and 176, as previously mentioned. After a selected, fixed delay time, which may be as short as a few nanoseconds, the same pulse is applied to the base of $Q_{1B}$ through the differentiating network involving components 194 and 196; note line (c) of FIG. 6. The pulse applied to $Q_{1A}$ triggers string 172 into conduction; causing the voltage at terminal 180 to fall rapidly, as depicted in line (b) of FIG. 6. When the delay time has elapsed, string 192 is triggered, in the manner previously indicated, which of course causes the voltage at terminal 200 to decay rapidly as shown in line (d). The net result is a near rectangular pulse that is coupled by capacitors 178 and 198 into the terminals 182 and 202 of the electro-optic shutter; note line (e) of FIG. 6. After completion of this pulse cycle, the voltage across the Pockels cell or other electro-optic shutter remains at zero because recovery time constants $R_A C_A$ and $R_B C_B$ are chosen equal. The circuit may be triggered again when the voltages across $C_A$ and $C_B$ have returned to their steady-state value as determined by the breakdown voltages of the avalanche strings.

The resistor 188 is disposed across the terminals 182 and 202 of the Pockels cell inasmuch as due to the nature of a Pockels cell, when it is energized by a fast rise time waveform, it has a tendency to ring, and this resistor damps out any such ringing tendency. A further purpose is served by resistors $R_A$ and $R_B$, this being to limit the breakdown current flow through the avalanche strings to a safe level. A further purpose of Capacitors $C_A$ and $C_B$ is to provide charge for the cell capacitance, thus preventing excessive voltage change at terminal 200 when string 172 is turned on.

As should now be clear, the advantage of our technique is that the long recovery time inherent in a single ended avalanche switch is avoided by using the double switch arrangement to generate a fast recovery pulse. If the appropriate time constants are chosen to be equal, the net output of the switch changes only during the time of the narrow pulse, with the two strings recovering together and keeping the net voltage across the cell equal to zero. If a single ended switch were used, the initial voltage change would be fast, followed of course by a slow recovery to the orginal value, and a fast pulse could not be isolated.

The number of transistors in strings 172 and 192 is determined by the voltage required on the electro-optic shutter for it to perform the desired function. It is not necessary that the number of transistors in the two strings be equal, and as a matter of fact, for some applications a bias voltage of several hundred volts may be required, which may be obtained by using different numbers of transistors of the two strings. The delay 186 may be brought about in any of several ways, depending on the amount of delay required. For example, for extremely short pulses (4–10 nanoseconds) a length of coaxial cable may be used, whereas for longer delays, a one-shot multivibrator or shift register may be required.

Referring to FIG. 7, it will be seen that we have depicted a Pockels effect cell to a large scale in order to make clear a number of relationships that are involved in a device of this type. Many crystalline materials, for example Lithium Niobate, may be used as Pockels effect cells if they are cut and polished so that their crystalline axes have the proper relationship to incoming optical radiation. A proper single crystal of such material has the important property that, with the application of an electric field to the crystal, the index of refraction of the material undergoes a relative change along two different directions, usually chosen to be perpendicular to the axis of the crystal. These two directions are called the fast axis and the slow axis because optical radiation linearly polarized parallel to one of them will move with a greater velocity than with respect to the other.

If a linearly polarized, collimated beam of optical radiation is incident upon a Pockels effect cell in such a manner that the incident polarization can be separated into two components, each parallel to either the fast or slow axis, the propagation time of one of the components through the crystal relative to the other component can be changed. For linearly polarized incident radiation, the operation generally results in an elliptically polarized output, but quite importantly, if a voltage equal to the half wave voltage of the crystal is applied, the phase shift between the two components will be 180° and the output will be linearly polarized orthogonal to the input polarization.

FIG. 7 depicts a transverse Pockels effect cell, into the end or (001) plane of which vertically polarized radiation is entering in this instance. As will be noted, this entering radiation is polarized parallel to the [010] direction. Although no rotation of the plane of polarization would occur if no voltage difference existed across the terminals 182 and 202 of this cell, at the instant of time represented by FIG. 7, an electric field exists parallel to the [010] direction as a result of a voltage difference being applied between the terminals 182 and 202. As a result, birefringence is induced in the cell, and elliptically polarized radiation exits from the output face of the cell, as depicted in this figure.

If a preselected proper voltage difference is caused to exist between the terminals of the cell, the output radiation will be linearly polarized orthogonal to the direction of the entering radiation, or in this example, the existing radiation becomes horizontally polarized, as shown in FIG. 7a. In this latter instance of course, the radiation will pass through the succeeding horizontal polarizer, as previously discussed.

As will be understood, this arrangement makes it possible for the entering radiation to be ejected from the throwout port of the succeeding polarizer except in the instance when the proper voltage difference is caused to exist between the terminals 182 and 202. We are of course not to be limited to this particular arrangement, which was provided by way of illustration.

Assume that the input radiation is vertically polarized so that the electric field is given by $$\vec{E}_{IN} = E_o \hat{j} \sin \omega t$$

where $E_o$ is the amplitude of the radiation, $\hat{j}$ is a vertical unit vector, $\omega$ is the angular frequency of oscillation, and $t$ is time. This expression may be rewritten as follows.

$$\vec{E}_{IN} = E_o/2 \, [(\hat{j}+\hat{i})\sin\omega t + (\hat{j}-\hat{i})\sin \omega t]$$

where $\hat{i}$ is a horizontal unit vector. The electric field $E_{in}$ has been decomposed into two vectors making angles of ±45° with the vertical direction. If these two vectors are parallel to the fast and slow axes of a Pockels effect cell, with an electric field applied, as shown in FIG. 7, one of them will be shifted in phase relative to the other and the output of the cell may be expressed as $$\vec{E}_{out} = E_o/2 \, [(\hat{j}+\hat{i})\sin\omega t + (\hat{j}-\hat{i})\sin(\omega t + \delta)]$$

where $\delta$ is the amount of relative phase shift. This expression in general represents elliptically polarized radiation, but in the special case where $\delta = \pi$, obtained by applying the proper voltage to the cell, the expression becomes $$\vec{E}_{out} = E_o/2[(\hat{j}+\hat{i}) \sin\omega t + (\hat{j}-\hat{i}) \sin(\omega t + \pi)]$$ or making use of a well known trigonometric identity $$\vec{E}_{out} = E_o \hat{i} \sin \omega t$$

This result shows that the polarization of the input radiation has been rotated through 90°, and may be blocked or transmitted by a properly oriented polarizer following the cell, which is the basis upon which the optical shutter operates. Optical radiation may be blocked or transmitted by applying or removing the so-called half-wave voltage to the Pockels effect cell.

As should now be apparent, we have provided a high speed pulse selection device capable of isolating a single high speed optical pulse from a train of pulses having a spacing of closer than say 10 nanoseconds, comprising an electro-optic shutter that includes an active portion and a succeeding polarizer. Such active portion has an input side arranged to receive the train of pulses from a suitable source, and an output side arranged to direct pulses that have passed therethrough, into the succeeding polarizer. The succeeding polarizer has a pair of output ports, with the plane of polarization of the succeeding polarizer being orthogonal to the plane of polarization of the train of pulses entering the active portion of the shutter. A novel high speed electronic switch means is connected to such active portion for controlling the polarization of the pulses passing therethrough, with this switch serving to change the birefringence of the active portion momentarily, such that the plane of polarization of the pulse to be isolated can be altered to enable it to pass through a selected part of the succeeding polarizer. The remaining pulses of the pulse train pass through a throwout port of the succeeding polarizer. Although a pulse application of this device has been described, our techniques will operate equally well with C.W. optical radiation, in which instance, a selected portion of radiation can be isolated.

The active portion of the electro-optic shutter has two terminals, and the high speed electronic switch is a double avalanche driver with separate, normally substantially non-conductive portions of such driver connected respectively to these two terminals. Means are provided for placing a high potential on each of the terminals, and means are also provided for energizing one portion of the driver to activate, and momentarily to become conductive so as to substantially lower the potential of one of the terminals of the active portion with respect to the other. The other portion of the driver is immediately thereafter caused to become conductive so as to equalize the potential of the terminals, with the polarization of the optical radiation passing through the active portion of said switch at the time one of the terminals is at a substantially different potential than the other being changed with respect to the polarization of the preceding and succeeding radiation. The optical radiation selected by such change of polarization will pass through a different outlet of the succeeding polarizer than did the non-selected radiation.

The potential of both of these terminals then slowly rises together to the original equilibrium value, such as to the half wave voltage of the active portion of the electro-optic shutter, so that the above-described procedure can be repeated. As is known, the half wave voltage is that voltage which causes a relative phase shift of 180° between the radiation polarized along the fast and slow axes of the crystal, which phase shift brings about a 90° rotation of the plane of polarization of the optical radiation, passing through the crystal.

Although we have characterized the active portion of the electro-optic shutter as preferably being a Pockels cell, certain other devices such as Kerr cell may be suitable for the purpose described herein. Also, although we have delineated the use of a high speed electronic switch in which each portion of the switch utilizes a string of serially connected transistors operative in the avalanche switching mode, we may, if such be desired, utilize instead a switch in which the switch portions incorporate suitable gas filled trigger devices such as thyratrons, krytrons, or spark gaps.

Although we obviously are not to be limited to such, nevertheless, the following component values associated with our dual avalanche driver may be regarded as appropriate for one exemplary embodiment of our invention:

| | |
|---|---|
| $R_A$ | 330KΩ |
| $R_B$ | 330KΩ |
| $C_A$ | 27 pfd |
| $C_B$ | 27 pfd |
| Capacitor 174 | 1500 pfd |
| Capacitor 194 | 1500 pfd |
| Resistor 176 | 56 ohms |
| Resistor 196 | 56 ohms |
| All transistors | 2N 2222 |
| Capacitor 178 | 1800 pfd |
| Capacitor 198 | 1800 pfd |
| Resistor 188 | 470 ohms |

We claim:

1. A high speed pulse selection device usable with a source of monochromatic collimated radiation that is supplying a train of closely spaced optical pulses, said device comprising a shutter capable of being disposed in the path of such radiation, said shutter having an electro-optic portion and an electronic portion, with said shutter being located such that the radiation is directed onto said electro-optic portion, and timing means connected so as to control the electronic portion of said shutter such that the electro-optic portion of said shutter can be momentarily opened in response to a stimulus from said timing means, said timing means including selector means serving to enable the selection of a single pulse from such pulse train, said timing means being operatively connected to the source of radiation and deriving synchronization therefrom, the natural frequency of the source of radiation being the repetition frequency of the output pulse train, said timing means serving to control said electronic portion of said shutter such that the electro-optic portion of said shutter will be opened at a time which coincides with the arrival of said electro-optic portion of a selected pulse from the source of radiation, so that such selected pulse can be transmitted to a point of use.

2. The single phase pulse selection system as defined in claim 1 in which the source is a pulsed source, emitting a pulse train wherein the pulses have a spacing as close as approximately 10 nanoseconds, said shutter being operative to isolate a single pulse of said train.

3. The single pulse selection system as defined in claim 1 in which the source is a C. W. source, and said shutter is operative to select out and isolate a small portion of the radiation from said source.

4. The high speed pulse selection device as defined in claim 1 in which said electro-optic portion of said shutter uses a Pockels cell as its active element.

5. The high speed pulse selection device as defined in claim 1 in which said electro-optic portion of said shutter uses a Kerr cell as its active element.

6. The high speed pulse selection device as defined in claim 1 in which said selector means makes it possible to recurringly select a single pulse.

7. The high speed pulse selection device as defined in claim 1 in which the source is a mode locked CW laser.

8. The high speed pulse selection device as defined in claim 1 in which said electronic portion of said shutter is a high speed electronic switch having two essentially nonconductive parts, means for causing a first part of said switch to become conductive, followed by the second part becoming conductive within a variable time interval as short as 10 nanoseconds, with said switch enabling said electro-optic portion of said shutter to isolate a pulse passing therethrough during the time period starting with the first part of said switch becoming conductive, and terminating with the second part becoming conductive.

9. The high speed pulse selection device as defined in claim 1 in which said electronic portion of said shutter has two terminals, said electronic portion including a double avalanche driver with separate, normally substantially non-conductive portions of such driver connected respectively to said two terminals, means for placing a high potential on each of said terminals, and means for energizing one portion of said driver to activate, and momentarily to become conductive so as to substantially lower the potential of one of said terminals of said active portion with respect to the other, with the other portion of said driver immediately thereafter being caused to become conductive so as to substantially lower the potential of the other of said terminals, with the polarization of the pulse or pulses passing through the electro-optic portion of said switch at the time one of said terminals is at a substantially different potential than the other being changed with respect to the polarization of the pulses of the train on each side thereof, as a result of which change of polarization, the pulse or pulses whose polarization has been changed will pass out through a different outlet of said device than the other pulses of such train.

10. The device as defined in claim 9 in which means are utilized for causing the potential on each of said terminals to rise together to an equilibrium value, latter action taking place in such a manner that there is no net voltage across the active portion of said switch until such time as the energizing of said driver is again caused to occur.

11. A single phase selection system for selecting a single high speed pulse emanating from a pulsed source of nonochromatic collimated radiation, said system comprising an electro-optic shutter disposed in the path of radiation from such source, an active portion of which shutter has a pair of cell terminals, a high speed electronic switch operatively connected to the terminals of said active portion of said electro-optic shutter so as to selectively control the passage of optical pulses therethrough, with the operation of said switch synchronized with the radiation from such source, said electro-optic shutter also including a polarized equipped with an output port and a throwout port, which polarizer is disposed in the path of radiation emanating from the exit side of said active portion of said electro-optic shutter, said electronic switch normally maintaining the potential on both of the cell terminals of said active portion such that there is no net voltage across the cell, and so that accordingly, the cell displays no net birefringence, with said polarizer serving to eject through its throwout port, any pulses passing through said electro-optic shutter during such time, and means for energizing said electronic switch such that it causes said electro-optic shutter to momentarily rotate the plane of polarization of the pulses desired to be isolated, such that the isolated pulse can pass through the output port of said polarizer and then be delivered to the point of utilization.

12. The single pulse selection system as defined in claim 11 in which said active portion of said electro-optic shutter has two terminals, and said high speed electronic switch is a double avalanche driver with separate, normally non-conductive portions of such driver connected respectively to said two terminals, means for placing a high potential on each of said terminals, and means for energizing one portion of said driver to activate, and momentarily to become conductive so as to substantially lower the potential of one of said terminals of said active portion with respect to the other, with the other portion of said driver immediately thereafter being caused to become conductive so as to substantially lower the potential of the other of said terminals, with the polarization of the pulse or pulses passing through the active portion of said switch at the time one of said terminals is at a substantially different potential than the other being changed with respect to the polarization of the pulses of the train on each side thereof, and as a result of such changes of polarization, the pulse or pulses affected will pass out through a different output port of said succeeding polarizer than the other pulses of the train.

13. The single pulse selection system as defined in claim 12 in which means are provided for causing the potential on said terminals to return comparatively slowly to essentially the original value, with such terminals charging equally, thus to avoid creating an undesirable voltage gradient across the active portion of said shutter during the recovery period.

14. A high speed pulse selection device capable of accomplishing a rapid switching of an electro-optic shutter, said switch being a differential switch having two portions, each portion comprising a string of serially connected transistors operative in an avalanche mode, with one portion of each string connected to a respective terminal of a two terminal shutter, means for charging said terminal to a high voltage, and means for selectively causing a substantial current to flow in first one portion and then the other, so as to successively and substantially discharge the terminals, with the time elapsing between the time one portion conducts and then the other portion conducts being an interval as short as 10 nanoseconds, during which period of time one terminal of said shutter is at a substantially higher potential than the other terminal, and means for selectively varying such interval.

15. The method of accomplishing the switching of an electro-optic shutter by the use of a dual high speed electronic switch having two principal portions constituted by series connected transistors operative in an avalanche mode, each of the strings being connected to a separate terminal of the shutter, and each string normally being substantially non-conductive, comprising the steps of charging said terminals to a high voltage, triggering one of said strings so as to cause it to carry substantial current and to rapidly discharge the respective terminal, and then immediately thereafter triggering the other of said strings, with the shutter being conductive insofar as radiation of a certain polarity is concerned only in the brief interval that one of said terminals is at a substantially higher voltage than the other.

16. A high speed optical radiation isolation device usable with a source of monochromatic collimated radiation supplying a continuous wave output, said device comprising a shutter capable of being disposed in the path of such radiation, said shutter having an electro-optic portion and an electronic portion, with said shutter being located such that the radiation is directed onto said electro-optic portion, said electronic portion having a delay circuit, and timing means connected so as to control the electronic portion of said shutter, such that the electro-optic portion of said shutter can be momentarily opened in response to a stimulus from said timing means, said timing means including an external pulse generator functioning to cause the electro-optic portion of said shutter to be opened when a pulse is supplied from said generator, said shutter then remaining open a length of time determined by said delay circuit, such that a pulse of radiation is emitted from the device, such pulse of radiation being of a width determined by the adjustment of said delay circuit.

17. A high speed pulse selection device usable with a Q-switched laser that is supplying a train of optical pulses, said device comprising a shutter capable of being disposed in the path of such radiation, said shutter having an electro-optic portion and an electronic portion, with said shutter being located such that the radiation is directed onto said electro-optic portion, and timing means connected for controlling the electronic portion of said shutter such that the electro-optic portion of said shutter can be momentarily opened in response to a stimulus from said timing means, said timing means including selector means for enabling the selection of a portion of variable width of the radiation from certain selected pulses within such train of pulses, said timing means being operatively connected to the source of radiation and deriving synchronization therefrom, said timing means serving to control said electronic portion of said shutter such that the electro-optic portion of said shutter will be opened at a time which coincides with the arrival of the selected portion of said pulse at said shutter, so that such selected radiation can then be transmitted to a point of use.

* * * * *